United States Patent
Yang et al.

(10) Patent No.: US 8,374,055 B2
(45) Date of Patent: Feb. 12, 2013

(54) ACOUSTIC COMMUNICATION AND LOCATING DEVICES FOR UNDERGROUND MINES

(75) Inventors: Tsih C Yang, Great Falls, VA (US); Altan Turgut, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 207 days.

(21) Appl. No.: 12/487,884

(22) Filed: Jun. 19, 2009

(65) Prior Publication Data
US 2010/0322034 A1 Dec. 23, 2010

(51) Int. Cl.
*G01S 3/80* (2006.01)
(52) U.S. Cl. .......................................... 367/127
(58) Field of Classification Search ............ 367/127
See application file for complete search history.

(56) References Cited

U.S. PATENT DOCUMENTS

| | | | | |
|---|---|---|---|---|
| 4,495,496 A * | 1/1985 | Miller, III | ................ | 340/10.2 |
| 4,879,755 A * | 11/1989 | Stolarczyk et al. | ............. | 725/41 |
| 5,907,281 A * | 5/1999 | Miller et al. | ................ | 340/573.6 |
| 6,272,073 B1 * | 8/2001 | Doucette et al. | ............. | 367/131 |
| 7,307,915 B2 | 12/2007 | Kimball | | |
| 7,539,573 B2 * | 5/2009 | Schwerin | ................ | 701/207 |
| 2001/0020218 A1 * | 9/2001 | Cosma | ................ | 702/13 |
| 2002/0098868 A1 * | 7/2002 | Meiksin et al. | ............... | 455/560 |
| 2005/0178558 A1 * | 8/2005 | Kolle et al. | ................ | 166/373 |
| 2005/0232084 A1 * | 10/2005 | DiNapoli | ................ | 367/139 |
| 2006/0034155 A1 * | 2/2006 | Etchenique | ................ | 367/134 |
| 2007/0090059 A1 * | 4/2007 | Plummer et al. | ............. | 210/743 |
| 2007/0211786 A1 * | 9/2007 | Shattil | ............. | 375/141 |
| 2008/0037370 A1 * | 2/2008 | Crowell | ................ | 367/127 |
| 2008/0175101 A1 * | 7/2008 | Saenger et al. | ................ | 367/43 |
| 2008/0204190 A1 * | 8/2008 | Cohn et al. | ................ | 340/3.1 |
| 2009/0140852 A1 * | 6/2009 | Stolarczyk et al. | ...... | 340/539.13 |

OTHER PUBLICATIONS

Park, Choon B., Miller, Richard D., Steeples, Don W., and Black, Ross A., "Swept Impact Seismic Technique (SIST)", Geophysics, vol. 61, No. 6 (Nov.-Dec. 1966): p. 1789-1803, 13 Figs.
Vibrometric "VIBSIST-20 Swept Impact Source for Small to Medium Range Surface High-Resolution Seismic Surveys".

* cited by examiner

*Primary Examiner* — Isam Alsomiri
*Assistant Examiner* — James Hulka
(74) *Attorney, Agent, or Firm* — Amy L. Ressing; Suresh Koshy (57) ABSTRACT

A system and method are described for locating and communicating with miners in an underground mine, in which miners carry a battery-powered signal unit with an impact actuator engagable with a wall, floor, or ceiling surface of the mine to transmit acoustic signals through the ground, and actuate controls on the unit to send a predefined message or a specific message via the impact actuator to ground-coupled acoustic receivers coupled with a base station that includes a decoder to determine the message sent by the miner and a location component to determine the miner's location based on the received signals.

18 Claims, 5 Drawing Sheets

ACOUSTIC COMMUNICATION AND LOCATING DEVICES FOR UNDERGROUND MINES

FIELD OF THE DISCLOSURE

The present disclosure relates generally to locating and communicating with underground miners and more particularly to methods and acoustic apparatus for communication and locating miners in underground mines.

BACKGROUND

Underground mines present many safety issues with regard to miners working in the mines. In particular, when a portion of a mine shaft or tunnel caves in or becomes obstructed or when miners suffer from medical conditions and are unable to exit the mine, it is desirable to locate and communicate with the miners. Conventionally, mine communications systems use either wired page phones running on batteries or radio wave communications. Wired systems are limited to areas where the page phones have been installed and the cables are subject to damage. One form of radio wave communications systems use a surface antenna providing a one-way short text message to the miners, but the coverage is typically limited to an area of 2500-3000 ft. in diameter. Other radio wave communications systems use a cabled network, known as a leaky feeder, and individual underground radio units (e.g., walkie-talkies) communicate with the network using the VHF band. However, since the radio waves do not penetrate the rock, communication is problematic if the radio units and network elements are not within "ling of sight" of each other.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. Systems and methods are presented hereinafter for locating and communicating with miners in an underground mine, in which miners carry a battery-powered signal unit with an impact actuator engagable with a wall, floor, or ceiling surface of the mine to transmit acoustic signals through the ground, and actuate controls on the unit to send a predefined message or a specific message via the impact actuator to ground-coupled acoustic receivers coupled with a base station that includes a decoder to determine the message sent by the miner and a location component to determine the miner's location based on the received signals. The disclosure advantageously avoids the problems associated with wireless RF communications, instead providing the miners with portable wireless acoustic communications alternatives, and also allows use of permanent or quickly setup surface base stations for processing received acoustics signals from miners. The signals, moreover, are encoded with predefined or specific messages by which the miner's can communicate their condition, status, or even location information, and the base station can use the received signals to ascertain the miner's location, and can even be used to receive and process messages sent by the miner by tapping on the mine wall. The base station may also use ground-based transducers to transmit sound signals, such as speech, to the miners, whereby the miners need not carry decoding receivers.

One or more aspects of the disclosure provide a system for locating and communicating with miners in an underground mine, which includes a battery-powered miner signal unit with an impact actuator operative when engaged by the miner with a wall, floor, or ceiling surface of the mine to transmit acoustic signals through the ground. The miner's unit also provides a user interface with one or more actuatable controls such as buttons to initiate communication via the impact actuator. The user interface has an encoder that generates encoded messages based on the actuated controls using seismic modulation and provides a corresponding modulated signal to the impact actuator for transmission through the ground. The system further includes three or more ground-coupled acoustic receivers at or near the surface, which receive the acoustic signals from the ground, as well as a base station operatively coupled to receive signals sensed by the acoustic receivers. The base station includes a decoder which decodes the received signals to determine a message sent by the miner signal unit, and a location component that determines the location of the miner signal unit based on the received signals.

In certain embodiments, the user interface has one or more preset controls associated with predefined messages, such as 'I am hurt' or 'I am OK' for transmission by the miner signal unit, and may also include general controls such as a keypad for the miner to enter a specific message for transmission by the signal unit. The system may also include ground-coupled acoustic transmitters operative by the base station to transmit acoustic signals to the ground for receipt by the miner without using any additional equipment, where the base station provides audible signals to the acoustic transmitters using time reversal techniques based at least in part on the determined location of the miner. The location component may use passive time-reversal to determine the location of the miner signal unit based on the signals received by the receivers, and the base station in certain embodiments performs baseline measurements continuously or periodically in order to characterize the acoustics of the mine and correlates the baseline measurements with known mine conditions to create and maintain a library. As incoming signals are received, the location component determines the miner location based on comparison of the signals received by the receivers with the library.

Further aspects of the disclosure relate to a method of locating and communicating with miners. The method includes engaging an impact actuator with a wall, floor, or ceiling surface of the mine, activating a user interface control to initiate communication via the impact actuator, automatically generating an encoded message based on the control using seismic modulation, and acoustically transmitting a modulated signal corresponding to the encoded message through the ground. The method further includes receiving acoustic signals from the ground using at least three ground-coupled acoustic receivers, decoding the received signals to determine a message, and determining a location of the miner signal unit based on the signals received by the receivers.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF THE DISCLOSURE

Figure 1:
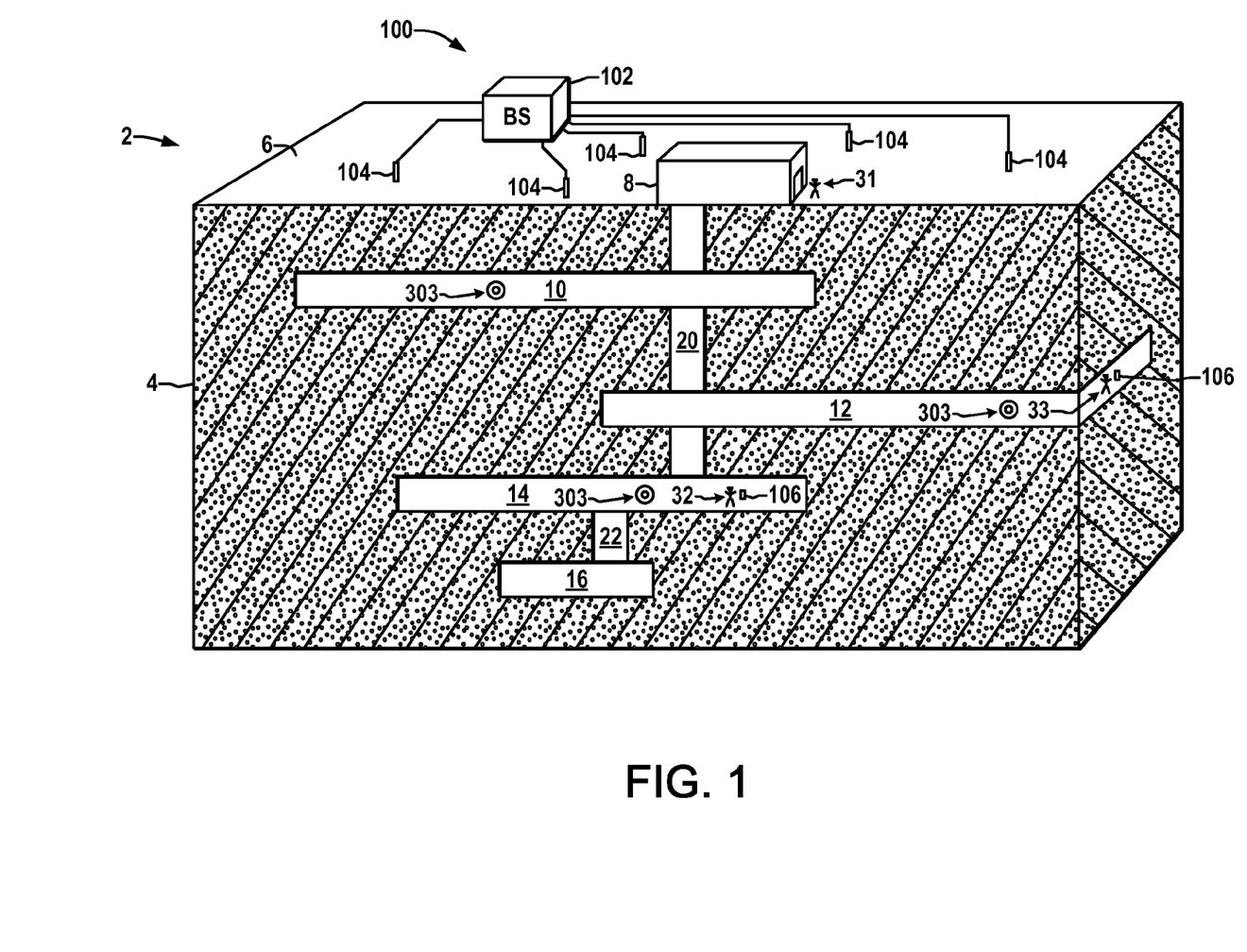
FIG. 1 is a partial sectional perspective view illustrating an exemplary portion of a mine equipped with a miner locating and communication system in accordance with one or more aspects of the present disclosure.

Referring to the figures, several embodiments or implementations are hereinafter described in conjunction with the drawings, where like reference numerals are used to refer to like elements throughout, and where the various features are not necessarily drawn to scale. Referring initially to FIG. 1, the presently disclosed systems 100 and methods may be advantageously employed to assist in locating miners 31-33 and communicating with miners 31-33 in underground mines 2, particularly in adverse situations where a miner 32 is unable to use other communications technologies and/or where the miner 32 may be hurt or unable to exit the mine 2. The disclosure provides miners 31-33 with portable devices 106, referred to herein as miner signal units, that can be used within a mine 2 to send predefined or custom (specific) messages which are transmitted through the rock or ground 4 via acoustic waves 110 for receipt and analysis using surface-based processing equipment 102, 104. A surface base station 102 uses these received signals to identify the miner's location within the mine 2 and may use this to send audible responsive communications to the miner 32, who does not need receiver equipment but instead will hear the reply from the base station 102 as audible sound. In certain embodiments detailed hereinafter, the location and communication system 100 includes three or more acoustic transducers 104 (transmitters/receivers) deployed at or near the surface 6 at some depths (depth 111 in FIG. 2), which are connected to the base station 102 where the received signals 110 are processed.

FIG. 1 illustrates a partial sectional perspective view of an underground mine 2 having a series of tunnels 10, 12, 14, and 16 and associated vertical shafts 20 and 22 under the surface 6 of the ground 4, in which one or more miners 31-33 may be located at any given time, typically performing mining work and other duties. Also shown is an exemplary system 100 for locating and communicating with the miners 31-33 in the mine 2. In FIG. 1, for example, a first miner 31 is entering the mine 2 via an entrance station 8, a second miner 32 is within a third-level mine tunnel 14, and a third miner 33 is in the second-level tunnel 12. The system 100 includes battery-powered miner signal units 106 operable by miners 31-33 within the mine 2, as well as three or more ground-coupled acoustic receivers 104 located at or near a ground surface 6 which operate to receive acoustic signals 110 from the ground 4.

Figure 2:
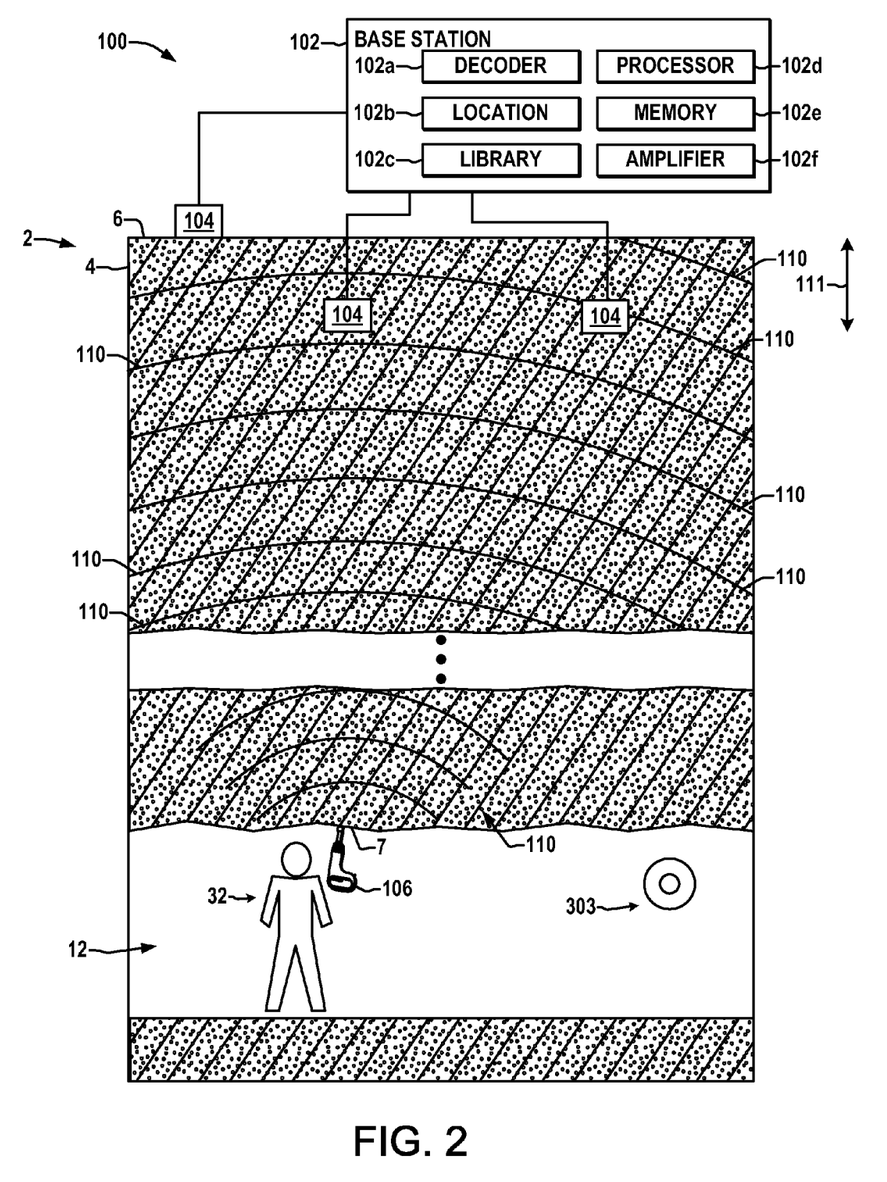
FIG. 2 is a partial sectional side elevation view illustrating further details of the base station and ground-based acoustic transducers in the system of FIG. 1.

Referring also to FIG. 2, the exemplary receivers 104 are also operable as acoustic transmitters (e.g., transceivers), and are engaged with the ground 4 either at the surface 6 or at a depth 111 below the surface 6, such as up to about several feet in one example. The system 2 further includes a base station 102 operatively coupled to receive signals sensed by the acoustic transceivers 104, and to provide signals for acoustic transmission be the transceivers 104. Other embodiments are contemplated in which separate receivers and transmitters are provided, each coupled with the base station 102 and operatively coupled with the ground 4 for signal exchange therewith. As best shown in FIG. 2, the exemplary base station 102 includes a processor 102$d$ and memory 102$e$ and is configured with suitable hardware and/or software to perform the functionality described herein, including a decoder component 102$a$ which operates to decode the signals received by the receivers 104 to determine a message sent by the miner signal unit 106, and a location component 102$b$ which operates to determine a location of the transmitting miner signal unit 106 based on the received signals. The signal to be transmitted to the miner 31-33 is generated by the processor 102$d$ and amplified by an amplifier 102$f$ of the base station 102 before it is transmitted by the transmitters 104. The level of amplification required in one possible implementation can be determined on a regular basis by checking the acoustic signal level received in the mine.

Figure 3:
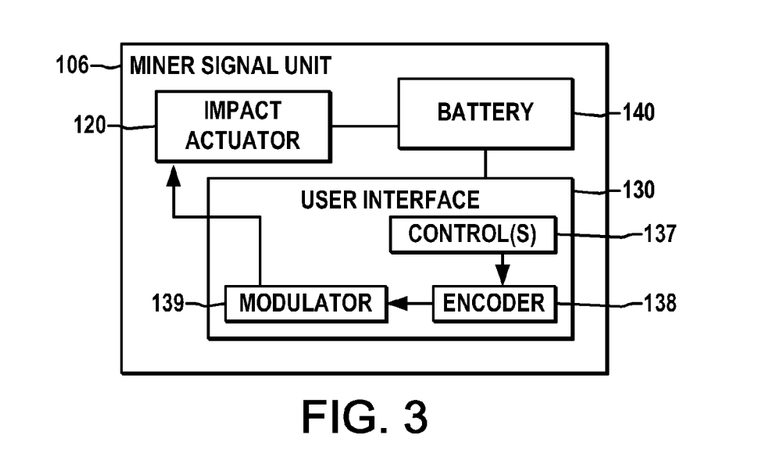
FIG. 3 is a simplified schematic diagram illustrating further details of an exemplary miner signal unit in the system of FIGS. 1 and 2.
Figure 4:
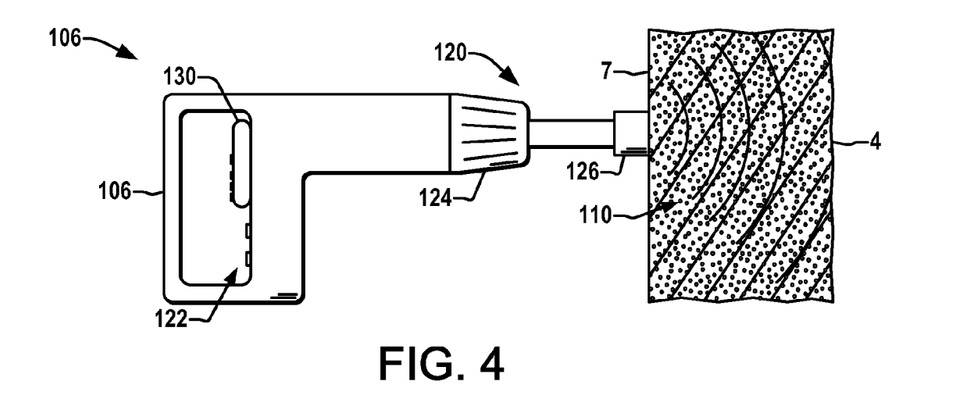
FIG. 4 is a partial side elevation view showing further details of the miner signal unit.
Figure 5:
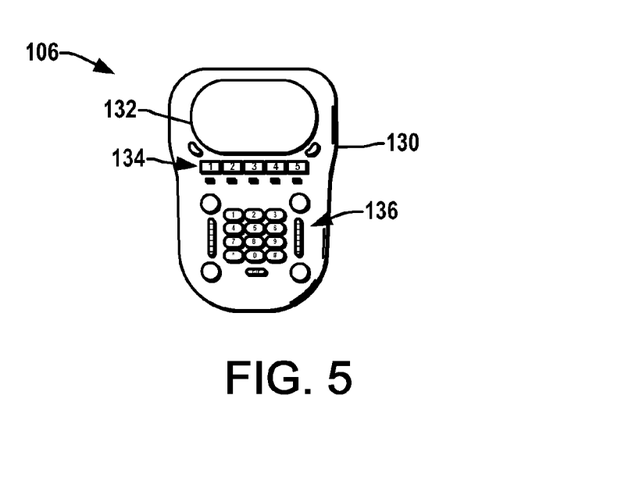
FIG. 5 is a partial front elevation view showing an exemplary user interface of the miner signal unit.

Referring also to FIGS. 3-5, the miner signal units 106 include an impact actuator 120 with an engaging member 126 coupled with the unit 106 by a clamping collar 124 (FIG. 4) or other suitable arrangement, and a battery (FIG. 3) providing power to the impact actuator 120. In operation, the miner 32 (FIGS. 2 and 4) engages the impact actuator 120 with a wall, floor, or ceiling surface 7 of the mine 2 to transmit acoustic signals 110 through the ground 4. The miner signal unit 106 further includes one or more controls 122, such as buttons or switches, and a user interface 130 (FIGS. 3-5) having controls 134 and 136 (FIG. 5) operable by the miner 32 to initiate communication via the impact actuator 120. As best shown in FIG. 3, the user interface 130 provides an encoder 138 that generates encoded messages based in whole or in part on the miner-actuated controls 134 and/or 136 using seismic modulation and to provide a corresponding modulated signal to the impact actuator 120.

Any form of seismic modulation may be used, including without limitation Swept Impact Seismic Technique (SIST), Vibrosis swept-frequency, and Mini-Sosie multi-impact techniques. In an exemplary SIST implementation, the encoder 138 and modulator 139 are operated by a control 137 of the interface 130 to provide signals to the impact actuator 120 which transmits tens or hundreds of high-frequency broadband seismic pulses during several seconds according to a time coding scheme in which the rate of impact in terms of cycles per second varies linearly as a function of time providing a broad range of impact rates to create acoustic signals 110 within the ground 4 as best shown in FIGS. 2 and 4, where the swept-frequency concept improves the suppression of correlation noise with much fewer impacts than normally used in the Mini-Sosie technique. By modulating the signals provided to the impact actuator 120, coded messages are constructed and transmitted as the signals 110 acoustically through the ground 4 from the miner 32 to the receivers 104.

As best shown in FIG. 2, the acoustic signals 110 propagate through the ground 4 from the impact actuator 106 up to the acoustic transceivers 104, and will typically arrive at the transceivers 104 at different times, base on the constitution of the intervening rock, earth, etc., the location of the miner 32 (the actuator 120), and the locations of the transceivers 104. In this regard, the location component 102b in the illustrated implementation of the base station 102 uses passive time-reversal to determine the location of the miner signal unit 106 based on the signals received by the receivers 104. The base station 102 in this regard determines the arrival times of the received signals on the various transducers. 104 and may employ filtering or signal isolation processing techniques to identify and separately analyze signals from multiple miners 31-33 at a given time. For a given source, the arrival time differences analyzed by the location component 102b to determine the origin of the signal source (e.g., the miner signal unit 106. The base station 102, moreover, may use the same or similar techniques to determine the origination of unencoded signals received at the transducers 104, such as taps or bangs by trapped miners 31-33 on the floor, walls, or ceiling surfaces of the mine 2.

In any of these applications, the base station 102 may employ any suitable communication signal processing techniques to detect signal arrival times and to decode received signals 110 in the presence of interference noise, and to disambiguate the presence of multiple simultaneous signal sources. In the illustrated embodiments, for example, the base station 102 performs one or more baseline measurements of acoustic signals from the acoustic receivers 104 to characterize the acoustics of the mine 2, where the baseline measurements may be done periodically, continuously, aperiodically, or otherwise, and are preferably done often so that the current state of the mine 2 is characterized when the system 100 is needed for miner locating and communications. The base station 102 in the illustrated implementation correlates the baseline measurements with known mine conditions to create and maintain a library 102c, and the location component 102b determines the location of the miner signal unit 106 based at least partially on comparison of the received signals 110 with the library 102c. In this manner, the system 100 is aware of how sounds emanating from a particular mine tunnel or shaft of the mine 2 are expected to appear in terms of signals received by the transducers 104. Using these and/or other techniques, the base station 102 performs signal processing to selectively detect the presence of weak signals and reject loud interferences to minimize localization errors and communications loss.

In operation of the system 100, when a particular miner (e.g., miner 32 in FIG. 2) becomes injured or trapped, he or she can initiate communication with, and location by, the base station 102 using the interface controls 134 or 136. As shown in FIG. 5, the exemplary user interface 130 includes a graphic display 132 that may be backlit for viewing in darkness, along with five preprogrammed or preset function key buttons 134 that are associated with corresponding predefined message for transmission by the miner signal unit 106. Possible predefined messages might be "I'm hurt"; "I'm OK"; "I'm Trapped"; "I'm alone"; or "I'm not alone". By using these preset controls 134, a miner 32 can initiate a quick communication to provide relevant information to personnel in the base station 102 while also generating a sonic communication 110 to allow the base station 102 to automatically determine the miner's location. As an alternative, the miner 32 can bang against the wail as a last resort, as the base station 102, under favorable conditions, might be able to discern acoustic deviations from the library readings to infer that the miner 32 may be in trouble and likewise determine the location of the source of the manual banging.

The interface 130 also includes general control elements 136, such as a keypad, track-ball, or other user-actuatable control by which the miner 32 may enter a specific message into the user interface 130, which may include prompting via the display 132. For example, the miner could enter a string of text characters to provide specific information to the base station personnel (e.g., "I have 30 minutes worth of oxygen left", or "I have a broken leg", or "I am pinned under some rocks") for transmission by the miner signal unit 106. Once the desired text is entered, the interface 130 encodes and modulates the message and the miner 32 can use another control feature on the interface 130 or a control 122 (FIG. 4) in the handle area of the signal unit 106 to initiate transmission of the acoustic signals 110 including the encoded message.

In another aspect of the disclosure, the base station personnel may reply back to the miner 32 using the system 100, which directs relevant audible sound toward the determined miner location using the transducers 104 operating as ground-based acoustic transmitters. In this manner, the miner 32 need not have receiver equipment but can instead be provided with the information, such as speech acoustically. In this mode of operation, the base station 102 provides audible signals for transmission to the miner 32 based at least in part on the location of the miner signal unit 106 and the message sent by the miner signal unit 106. To refine this functionality, the base station 102 may use time reversal to temporally offset transmission of the acoustic signals to the ground 4 by at least two different ones of the ground-coupled acoustic transmitters 104 based at least partially on the determined location of the miner signal unit 106 so that the acoustic down-link signals are received approximately at the same time at the determined location. In this manner, multiple transmitters 104 send acoustic waves which arrive at the miner's location in phase at the same time to increase the chances that the miner 32 can hear the message. Further back and forth communication is thereafter possible with the miner 32 using the interface 130 to send encoded messages to the base station 102 and the base station 102 responding acoustically using the transmitters 104.

Figure 7:
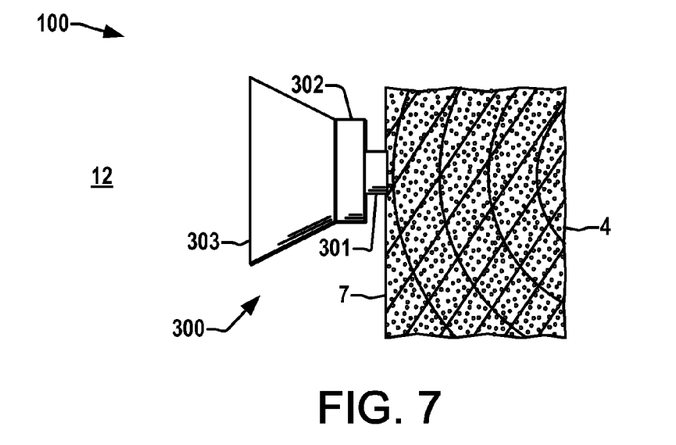
FIG. 7 is a simplified partial side elevation view in section illustrating an exemplary sound amplifier and speaker arranged in a mine tunnel or shaft in accordance with further aspects of the disclosure.
Figure 8:
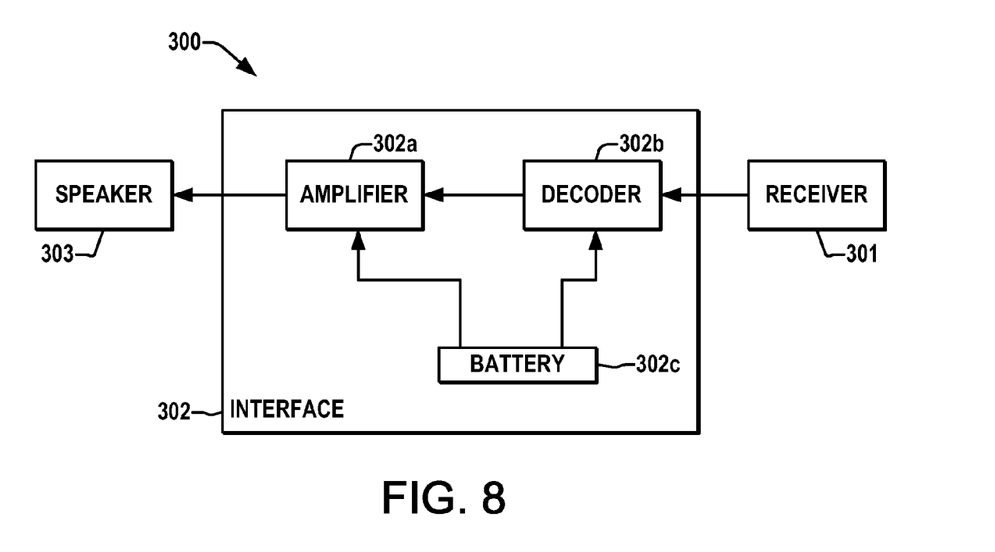
FIG. 8 is a schematic diagram illustrating further details of the amplifier in FIG. 7 in accordance with the present disclosure.

Referring also to FIGS. 7 and 8, when desired, as when the ambient noise in the mine 2 is too loud, the system 100 may further include a receiver/amplifier/speaker arrangement 300 to amplify the acoustic signal transmitted via the transmitters 104 by the base station 102. The arrangement 300 can be mounted on the wall 7 or other suitable location of the mine tunnel 12 as shown in FIG. 7 to receive acoustic signals sent by the base station 102. The device 300 includes an acoustic receiver 301 that couples to the wall 7 to receive the acoustic signals from the base station 102, an interface unit 302 that amplifies the acoustic signal, and a speaker 303 that broadcasts the amplified acoustic signal for improved reception by miners 31-33 within the mine tunnel or shaft 12. Optionally, the interface 302 may include a decoder 304 for decoding digital signals transmitted from the base station 102 for amplification and broadcasting to the miners 31-33. In this implementation, the decoded signal is converted to an acoustic signal by the decider 302b and amplified by an amplifier 302a before it is broadcasted by the speaker 302. In one embodiment, the interface 302 is battery powered, but alternate power sources may be used.

Thus, the illustrated embodiments of the base station 102 combat inter-symbol communications interference by use of active time-reversal to down-link communication to the miner 32 and passive time-reversal for processing received up-link communications signals from the receivers 104. In addition to communicating with miners 31-33, the base station processing can employ matched field processing (MFP) in locating other underground activities, such as mine explosions, cave-ins, etc. Having continuously tracking the sound from underground, the base station 102 can determine where a mine accident is, and can initiate speech communication to miners (if any) in that area, preferably using the above-described time reversal techniques so as to provide instructions to help the miner(s). Such processing techniques can be used to correlate received data with replicas stored in the library 102c of the base station 102, where a library replica which best matches the received data indicates the origin of the data. For instance, calibration sweeps can be done with a sound source being moved throughout the mine at known locations at known times to generate a library of replicas for comparison in operation of the base station. In up-link communications, residue inter-symbol-interference can be further removed using channel equalizer processing in the base station 102. This option is not available to the trapped miner unless he has a sophisticated device.

Figure 6:
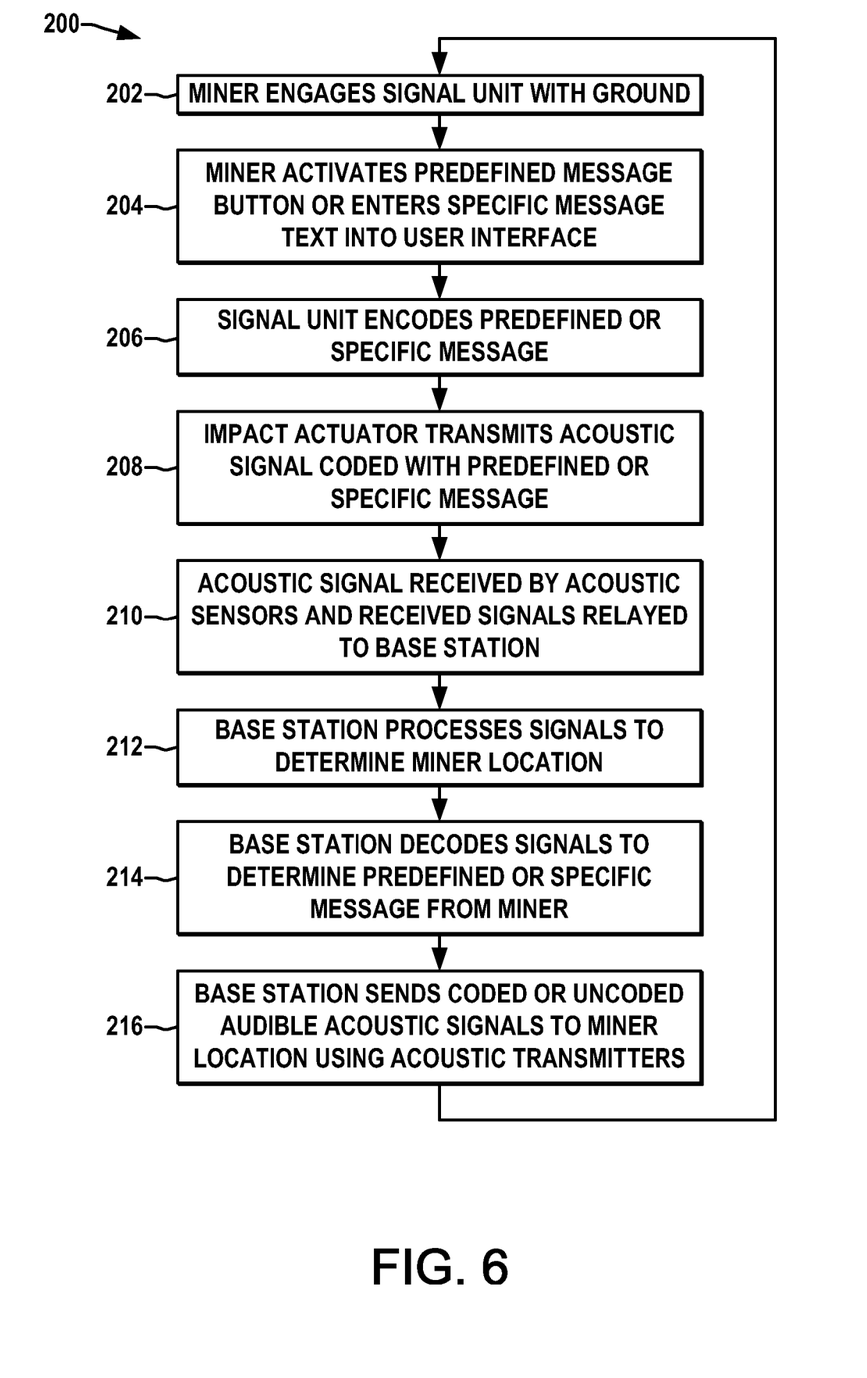
FIG. 6 is a flow diagram illustrating an exemplary method for locating and communicating with miners in an underground mine in accordance with the disclosure.

Referring also to FIG. 6, an exemplary method 200 is illustrated for locating and communicating with miners 31-33 in an underground mine 2. Although the method 200 is illustrated and described hereinafter as a series of acts or events, the various methods of the invention are not limited by the illustrated ordering of such acts or events. In this regard, some acts or events may occur in different order and/or concurrently with other acts or events apart from those illustrated and described herein, and not all illustrated steps may be required to implement a process or method in accordance with the present disclosure. The methods of the disclosure, moreover, may be implemented in association with the illustrated communication and locating systems, messages, and signal units, as well as with other apparatus not illustrated or described, wherein all such alternatives are contemplated as falling within the scope of the present disclosure. The method 200 begins at 202 with a miner (e.g., miners 31-33 above) engaging an impact actuator (actuator 120 of signal unit 106 above) with a wall, floor, or ceiling surface 7 of the mine 2. At 204, the miner activates a preset or general control 134, 136 of a user interface 130 to initiate communication of a predefined or specific message via the impact actuator 120. At 206, the miner signal unit 106 automatically generates an encoded message based at least partially on the actuated control 134, 136 using seismic modulation, and the impact actuator 120 acoustically transmits a modulated signal at 208 corresponding to the encoded message through the ground 4. At 210, the acoustic signals 110 are received from the ground 4 using at least three ground-coupled acoustic receivers 104 and these are provided to the base station 102 for decoding and other processing at 212 and 214 to determine a miner location and a message (predetermined or specific) sent by the miner. The location determination at 214 may optionally include use of passive time-reversal based on the received signals.

The method 200 may optionally include transmitting coded or uncoded audible signals to the miner 31-33 at 216 based at least in part on the determined miner location using three or more ground-coupled acoustic transmitters 104, and the process 200 continues as described above. The transmission at 216 may include using time reversal to temporally offset transmission of the acoustic signals by at least two different ones of the ground-coupled acoustic transmitters 104 based at least partially on the determined location of the miner signal unit 106 so that the acoustic signals are received approximately at the same time at the determined miner location. Moreover, the method 200 may further include performing one or more baseline measurements of acoustic signals from the acoustic receivers 104, such as periodically, aperiodically, or continuously, etc., as well as correlating the baseline measurements with known mine conditions to create and maintain a library 102c (e.g., FIG. 2 above), where the miner location is determined by comparison of the received signals with the library 102c.

The above examples are merely illustrative of several possible embodiments of various aspects of the present disclosure, where equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A system for locating and communicating with miners in an underground mine, comprising:
    a battery-powered miner signal unit operable by a miner within the mine and comprising:
        an impact actuator operative when engaged by the miner with a wall, floor, or ceiling surface of the mine to transmit acoustic signals through the ground, and
        a user interface having at least one miner-actuatable control to initiate communication via the impact actuator, and an encoder operative to generate an encoded message based at least partially on the at least one miner-actuatable control using seismic modulation and to provide a corresponding modulated signal to the impact actuator;
    at least three ground-coupled acoustic receivers proximate a ground surface and operative to receive acoustic signals from the ground; and
    a base station operatively coupled to receive signals sensed by the acoustic receivers, the base station comprising:
        a decoder operative to decode the signals received by the receivers to determine a message sent by the miner signal unit,
        a channel equalizer using active time-reversal to process down-link communication to the miner and passive time-reversal to process up-link communication from the acoustic receivers, and
        a location component operative to determine a location of the miner signal unit based on the signals received by the receivers.

2. The system of claim 1, where the user interface comprises at least one preset control associated with a predefined message for transmission by the miner signal unit.

3. The system of claim 2, where the user interface comprises at least one general control operable by a miner to enter a specific message into the user interface for transmission by the miner signal unit.

4. The system of claim 1, where the user interface comprises at least one general control operable by a miner to enter a specific message into the user interface for transmission by the miner signal unit.

5. The system of claim 1, further comprising at least three ground-coupled acoustic transmitters proximate the ground surface and operative to transmit acoustic signals to the ground, where the base station is operatively coupled to the acoustic transmitters to provide audible signals for transmission to the miner based at least in part on the location of the miner signal unit and the message sent by the miner signal unit.

6. The system of claim 5, comprising three or more ground-coupled integrated acoustic transceivers proximate the ground surface individually including one of the acoustic transmitters and one of the acoustic receivers.

7. The system of claim 6, where the base station uses time reversal to temporally offset transmission of the acoustic signals to the ground by at least two different ones of the ground-coupled acoustic transmitters based at least partially on the determined location of the miner signal unit so that the acoustic signals are received approximately at the same time at the determined location.

8. The system of claim 5, where the base station uses active time reversal to temporally offset transmission of the acoustic signals to the ground by at least two different ones of the ground-coupled acoustic transmitters based at least partially on the determined location of the miner signal unit so that the acoustic signals are received approximately at the same time at the determined location.

9. The system of claim 1, where the location component uses passive time-reversal to determine the location of the miner signal unit based on the signals received by the receivers.

10. The system of claim 1, where the base station performs one or more baseline measurements of acoustic signals from the acoustic receivers to characterize the acoustic characteristics of the mine and correlates the baseline measurements with known mine conditions to create and maintain a library, and where the location component is operative to determine the location of the miner signal unit based at least partially on comparison of the signals received by the receivers with the library.

11. The system of claim 1, further comprising:
at least one acoustic receiver coupled with a wall, floor, or ceiling surface of a mine tunnel or shaft to receive acoustic signals transmitted through the ground by the base station using one or more ground-coupled acoustic transmitters;
an amplifier operatively coupled with the acoustic receiver to amplify acoustic signals received by the receiver; and
a speaker operatively coupled with the amplifier to broadcast amplified acoustic signals;
where the base station is operatively coupled to the acoustic transmitters to provide audible signals for transmission to the miner based at least in part on the location of the miner signal unit and the message sent by the miner signal unit.

12. A method of locating and communicating with miners in an underground mine, the method comprising:
a miner engaging an impact actuator with a wall, floor, or ceiling surface of the mine;
the miner activating a control of a user interface to initiate communication via the impact actuator;
automatically generating an encoded message based at least partially on the at least one miner-actuatable control using seismic modulation;
the impact actuator acoustically transmitting a modulated signal corresponding to the encoded message through the ground;
receiving acoustic signals from the ground using at least three ground-coupled acoustic receivers;
decoding the signals received by the receivers to determine a message sent by the miner at least in part by using passive time-reversal to process up-link communication from the acoustic receivers and removing inter-symbol-interference using channel equalizer processing;
determining a location of the miner based on the signals received by the receivers; and
using active time-reversal to process down-link communication to the miner using channel equalizer processing.

13. The method of claim 12, where the miner activating a control comprises the miner activating at least one preset control associated with a predefined message.

14. The method of claim 12, where the miner activating a control comprises the miner entering a specific message using at least one general control.

15. The method of claim 12, further comprising transmitting audible signals to the miner based at least in part on the determined location of the miner signal unit using at least three ground-coupled acoustic transmitters.

16. The method of claim 15, where transmitting audible signals to the miner comprises using time reversal to temporally offset transmission of the acoustic signals by at least two different ones of the ground-coupled acoustic transmitters based at least partially on the determined location of the miner signal unit so that the acoustic signals are received approximately at the same time at the determined location.

17. The method of claim 12, where determining a location of the miner signal unit comprises using passive time-reversal to determine the location of the miner signal unit based on the signals received by the receivers.

18. The method of claim 12, further comprising:
performing one or more baseline measurements of acoustic signals from the acoustic receivers; and
correlating the baseline measurements with known mine conditions to create and maintain a library;
where determining the location of the miner signal unit comprises comparing the signals received by the receivers with the library.

* * * * *